June 5, 1956 — L. B. VANDENBERG — 2,748,710
HEAT-EXCHANGER PUMP
Filed April 26, 1955 — 4 Sheets-Sheet 1

INVENTOR.
Leonard B. Vandenberg
BY
Roland A. Anderson
Attorney

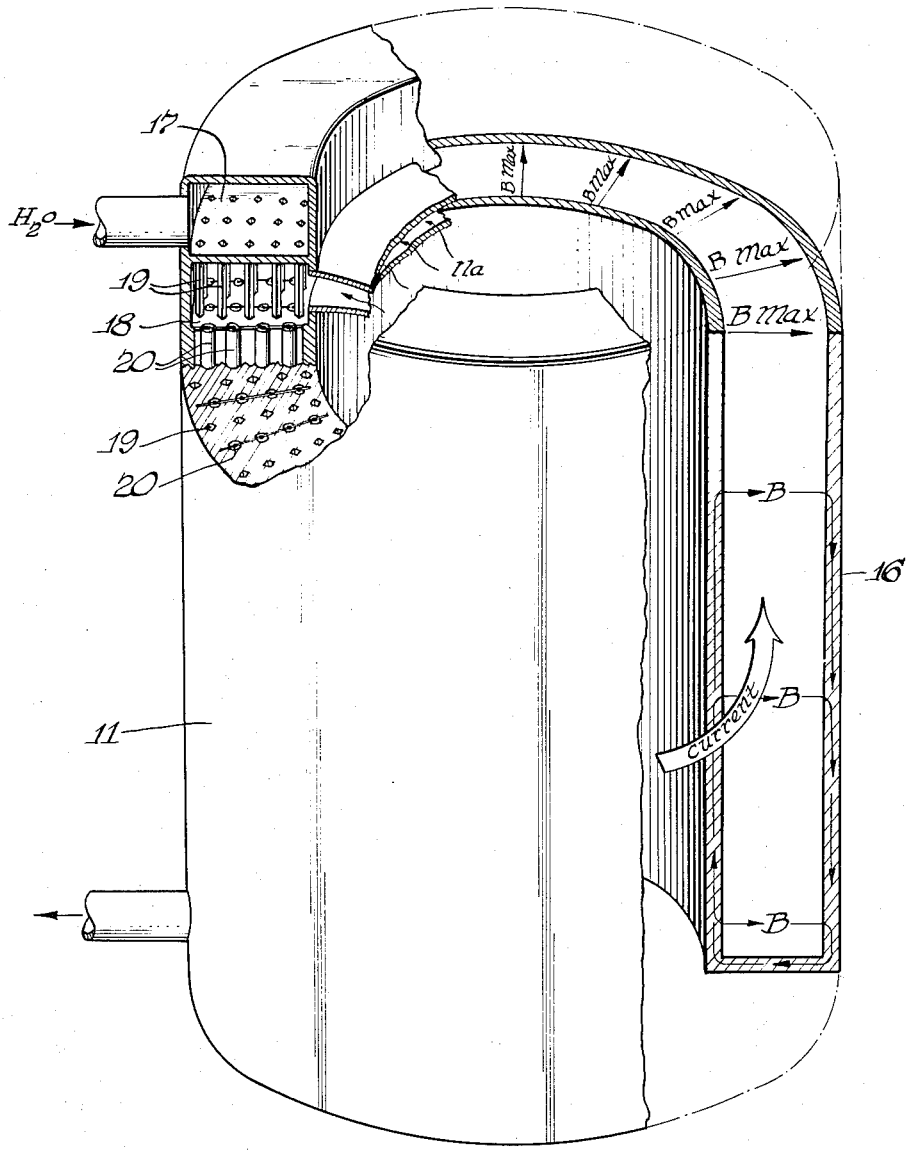

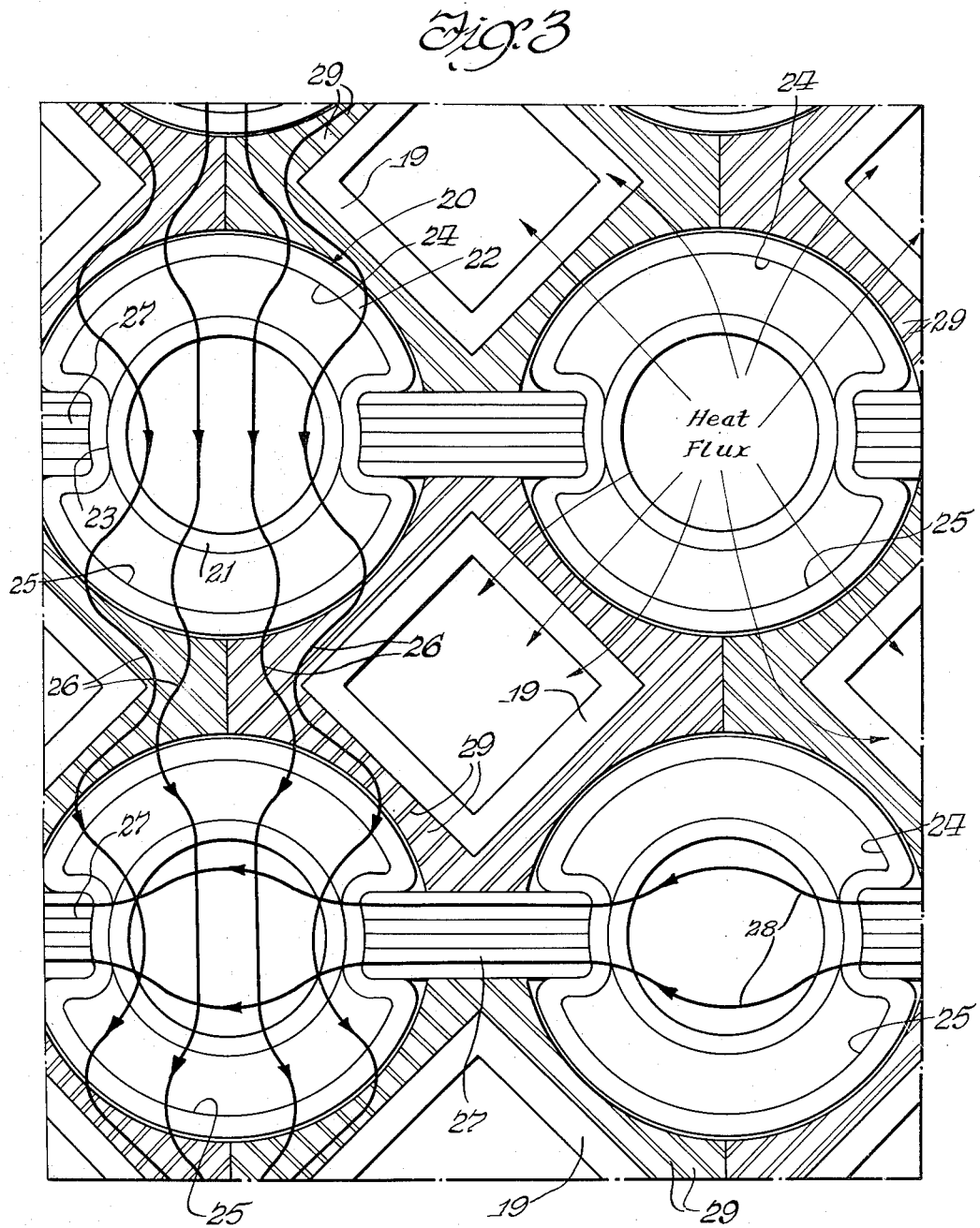

June 5, 1956 — L. B. VANDENBERG — 2,748,710
HEAT-EXCHANGER PUMP
Filed April 26, 1955 — 4 Sheets-Sheet 4

INVENTOR.
Leonard B. Vandenberg
BY
Attorney

United States Patent Office 2,748,710
Patented June 5, 1956

2,748,710

HEAT-EXCHANGER PUMP

Leonard B. Vandenberg, Sharon Springs, N. Y., assignor, by mesne assignments, to the United States of America as represented by the United States Atomic Energy Commission Application April 26, 1955, Serial No. 504,125

5 Claims. (Cl. 103—1)

This invention relates to pumping and heat exchange means for systems employing electrically conducting liquids such as liquid metals. In particular, the invention pertains to a compact, self-regulating, liquid-liquid or liquid-gas heat exchange system embodying as an element therein a thermoelectrically energized pump in which circulation of a liquid conductor is achieved by the generation of an electric current due to the temperature gradient normally existing between the hot and cold fluids of the heat exchanger.

The invention is especially applicable to high temperature installations in which space, weight and radioactivity considerations are significant. Such conditions exist in nuclear reactor power plants. In conventional reactor power plant arrangements, the reactor vessel, heat exchangers, pumps, and surge tanks are connected with a network of pipes. Since the primary coolant passing through the reactor becomes radioactive, this entire system is enclosed with a heavy biological shield. The shielding covers nonfunctional space between pipes and vessels as well as that space occupied by the actual heat transfer equipment. In some power plant layouts the nonfunctional space between pipes and vessels may be as much as twice that of the actual equipment volume. The space and weight requirements of the reactor compartment can be reduced substantially by nesting the reactor proper within a cylindrical heat exchanger. This also reduces the amount of radioactive coolant.

Accordingly it is the object of this invention to provide a compact self-regulating pump and heat exchanger capable of being arranged in a cylindrical volume about a primary heat source such as a liquid-conductor cooled neutronic reactor. It is a further object of this invention to obtain the pumping action by generating an electric current in the heat exchanger by means of the temperature gradient normally existing between the hot and cold tubes, creating the necessary crossed magnetic field with iron pole pieces, and thus producing sufficient pumping force on the liquid metal.

This invention may be more fully understood by reference to the accompanying drawings, wherein:

Fig. 2 is a schematic diagram of a heat exchanger pump of cylindrical configuration adaptable for use in a reactor system of the type illustrated in Fig. 1;

Fig. 3 is a schematic diagram showing heat flow and the current and magnetic paths in an enlarged section of a heat exchanger pump according to this invention;

Figure 1:
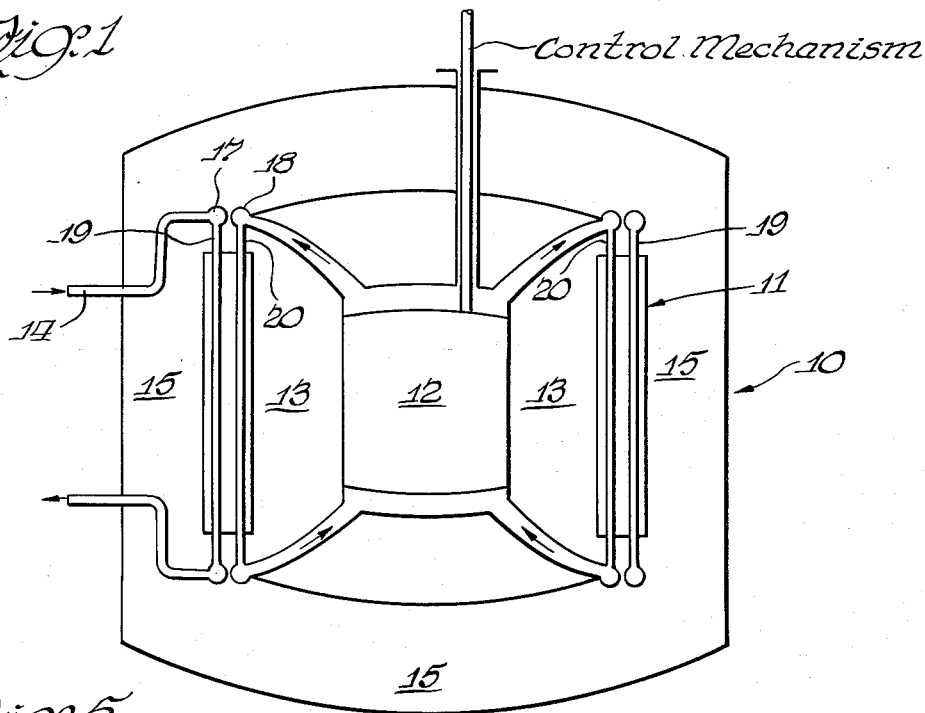
Fig. 1 is a schematic diagram of a nuclear reactor embodying a heat exchanger pump according to the present invention.

With reference to Fig. 1, there is shown a schematic diagram of the compact reactor power unit 10. The heat exchanger-pump component 11 is located in cylindrical form around the reactor proper 12. A neutron shield 13 is introduced between the reactor and heat exchanger-pump to reduce the gamma activation of the secondary coolant entering the unit through conduit 14. Upon leaving the heat exchanger, the secondary coolant may be piped to a steam separator and to a turbine where it can perform useful work. Sufficient additional or secondary shielding 15 is added outside the heat exchanger-pump to meet health physics tolerances. The materials of construction of the heat exchanger-pump 11 contribute significantly to the shield. The usual mechanisms for control and refueling can be applied to the top of the assembly. In an alternate arrangement the component may be a boiler instead of a heat exchanger. In this case, the pipes containing the secondary coolant will show water in and steam out.

Figure 4:
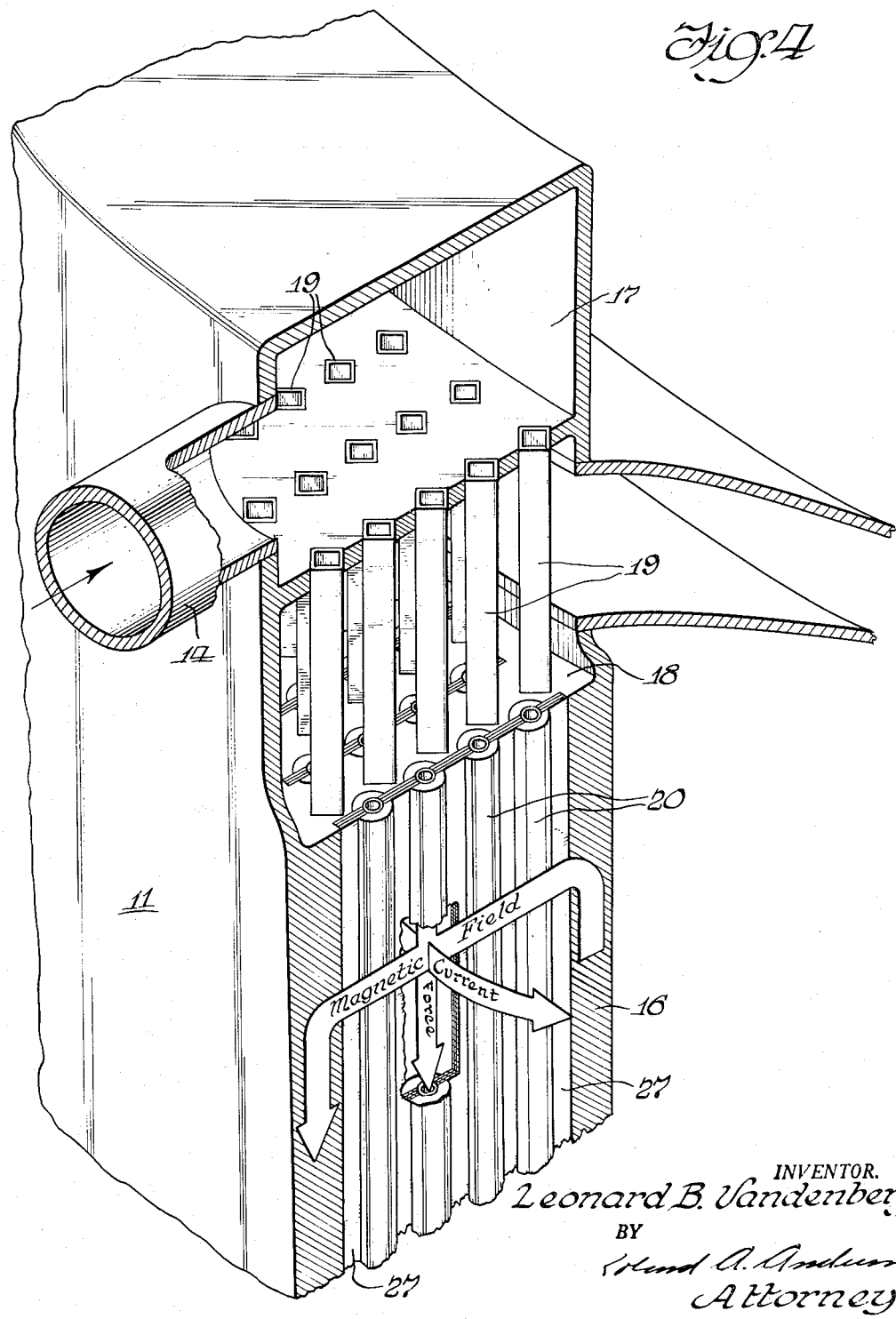
Fig. 4 is an isometric view of a portion of the heat exchanger pump of Fig. 2.

As shown in Figs. 2 and 4 the heat exchanger component 11 consists of a cylindrical iron shell 16 provided with an annular header 17 for a secondary coolant such as water and a second annular header 18 for the primary coolant, which may be any electrically conducting liquid such as liquid sodium. Corresponding headers, not shown, are provided at the lower end of the apparatus. Copper jacketed tubes 19 connect the upper and lower water headers. Tubes 20 connect the upper and lower sodium headers.

Figure 5:
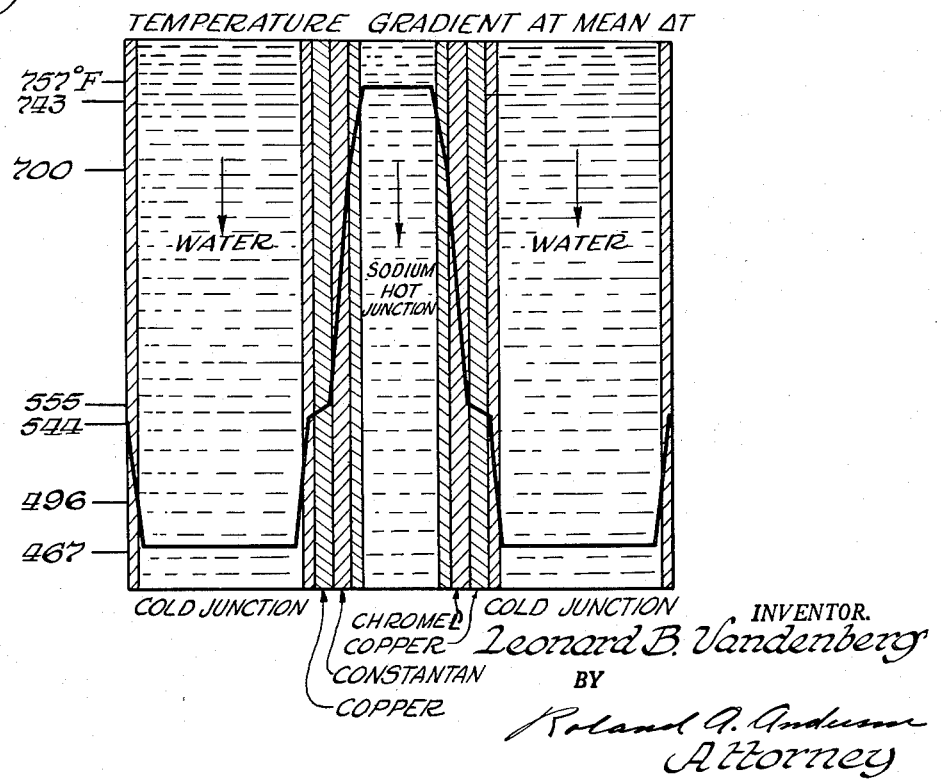
Fig. 5 is a side view of the heat exchanger tube arrangement of this invention showing the temperature profile illustrating the gradient established in the thermoelements under the conditions given in the illustrative example, infra.

As shown in Fig. 3, the tubes 20 have inner circular walls 21 and outer walls 22 surrounding the inner walls. The outer walls are spaced radially from the inner walls except at two diametrically opposed areas 23 where the outer walls are brought into contact with the inner walls. The outer and inner walls thus define two approximately semi-cylindrical chambers 24, 25 on opposite sides of the pipe 21 and separated from each other by the areas 23 where the inner and outer walls are in contact. The chambers 24, 25 contain the thermocouple strips arranged in series so that the voltage generated by each thermocouple is added to that generated by the adjacent thermocouple. As shown in Figs. 3 and 5, the thermocouples may be composed of constantan in chambers 24 and Chromel in chambers 25. With this arrangement the thermoelectric current, I, will be in the direction of the arrows 26 between adjacent tubes 20.

If desired, the outer walls or jackets 22 may be eliminated, thereby simplifying the design.

The thermocouples are arranged in series to form a circular path so that a circulating current will result as indicated by the arrow in Fig. 4. The magnitude of the current is a function of the temperature gradient in the thermocouple elements, the resistance of the circulating current path, and any back electromagnetic force that may be generated by sodium moving in a magnetic field.

The circulating current produces strong magnetic fields in the iron shell 16 (Figs. 1, 4) which are directed as shown by arrows 28 (Fig. 3) by the laminated iron pole pieces 27 (Figs. 3, 4) transversely of the current in the sodium containing tubes. The reaction of the magnetic field and sodium conducting the circulating current produces a longitudinal force on the sodium which provides the pumping power. This interaction of forces is illustrated in Fig. 4.

Preferably in areas used for the generation of the magnetic field the iron pole pieces are laminated to provide a high electrical resistance to short circuiting of individual thermocouple elements and to causing the current to flow around the heat exchanger pump unit by way of the low resistance copper and sodium 29 which fills the interstices between the water tubes, sodium tubes and pole pieces in order to reduce thermal and electrical resistance.

An an illustrative example of this invention a heat exchanger pump for a 60 megawatt (heat) power plant requiring 6000 gallons per minute pumping will have the following characteristics where the thermocouple elements are constantan and Chromel and the tubes are of 347 stainless steel.

| | |
|---|---|
| Heat transfer rate | $200 \times 10^6$ B. t. u./hr. |
| Over-all dimensions | 108 in. O. D.$\times$58 in. I. D.$\times$105 in. long. |

*Sodium*

| | |
|---|---|
| Inlet temperature | 850° F. |
| Outlet temperature | 600° F. |
| Flow | 6000 G. P. M. |
| Tube size | 0.84-in. I. D., 0.96-in. O. D. |
| Flow velocity | 4.9 ft./sec. |
| Number of tubes | 707 |
| Tube length | 105 in. |

*Water*

| | |
|---|---|
| Inlet temperature (condensate). | 135° F. |
| Outlet temperature | 467° F. |
| Tube size | 1.25-in. I. D., 1.45-in. O. D. |
| Number of tubes | 707 |
| Tube length | 105 in. |

The tube arrangement of a pump having the foregoing characteristics is shown in Fig. 5. The heavy solid line is the temperature profile, illustrating the gradient established in the thermoelements. The sodium tubes are the hot junctions and the water tubes cool the copper cold junctions of the thermocouple. The log mean temperature difference is 290° F. The pressure output of the thermoelectric pump is 14.5 p. s. i.

The pump has self-regulating features. An increase in reactor power reulting in a rise in sodium temperature will cause increased pumping action. An increase in demand from a turbine powered by the secondary coolant also increases the temperature gradient on the thermoelements and causes increased pumping action. For control of liquid metal flow, an electrical resistance can be introduced in the circulating path in a manner similar to that of a reactor control rod. Control can also be obtained by adjusting the reluctance across the magnetically open end of the annular magnet. A change in the reluctance in this area affects the distribution of leakage flux across the tubes along the entire length of the magnet.

The heat exchanger pump of this invention eliminates the well known problems associated with insulation in some electromagnetic pumps or with seals and bearings in mechanical sodium pumps. Emergency or stand-by cooling is automatically provided so long as the water coolant supply is not interrupted.

The Chromel P-constantan couple was chosen for the illustrative design because of wide experience with these materials in thermocouple applications. Other elements and alloys may be considered for this application. In general, the thermoelectric power of most elements and alloys is less than 100 microvolts/°C. Larger thermoelectric values are found in alloys containing antimony, bismuth, selenium, tellurium, and silicon in combination with other materials. Thermoelectric powers of the order of 250 microvolts/°C. are indicated. This value may be increased to 1000 microvolts/°C. by the use of some semiconductors. It appears possible, therefore, to enhance the pumping action beyond that required for the illustrative design by the selection of other couple materials.

While sodium is used in the illustrative example, it is to be understood that a heat-exchanger pump according to this invention can utilize any electrically conductive liquid. For example, liquid metals such as mercury may be used, and also fused electrically conducting salts may be employed.

It will be seen that a heat exchanger pump has been provided which has many advantages in reducing the size and weight required by present practice wherein the heat exchanger and the pumps are separate units requiring valves, piping and the like. The apparatus of this invention has a further advantage over the prior art in that it eliminates bearings, seals, and all moving parts. Additionally, the heat exchanger pump of this invention is basically self-regulating and requires no maintenance. Operation of the heat exchanger pump is economical since the energy supply is essentially free, as the energy absorbed for circulation of the primary coolant does not decrease the availability of energy to the turbine and furthermore requires no external power supply. The thermocouple generator merely takes the more available higher temperature energy of the hot source and releases usable energy before it is rejected to the receiver or turbine supply as compared with a conventional heat exchanger in which this same process takes place without any release of the available energy.

While the heat exchanger pump of the subject invention has been described in relation to a specific embodiment it is to be understood that the invention is not limited thereto but only by the appended claims.

I claim:

1. A combined heat exchanger and thermoelectrically energized pump comprising a first and a second group of tubes, thermocouple elements on opposite sides of the tubes of one of said groups, an electrically conducting fluid in the tubes provided with thermocouple elements, said first and second groups of tubes being arranged in heat exchange relationship to provide hot and cold junctions for said thermocouple elements whereby a thermoelectric current is generated across the tubes containing the electrically conducting fluid, means magnetized by said current and arranged in proximity to the tubes containing the electrically conducting fluid, said means providing a magnetic field transversely of the current whereby a pumping force is produced longitudinally of the tubes containing the electrically conducting fluid.

2. A combined heat exchanger and thermoelectrically energized pump comprising a first group of tubes adapted to contain a cold fluid and a second group of tubes adapted to contain an electrically conducting hot fluid, thermocouple elements adjacent opposite sides of the tubes of the second group, said first and second groups of tubes being arranged in heat exchange relationship to provide cold and hot junctions for the thermocouple elements to generate a thermoelectric current across the tubes of the second group, material magnetizable by the thermoelectric current and including laminated pole pieces contacting adjacent tubes of the group to provide a magnetic field transversely of said current and generate a pumping force on the electrically conducting fluid in a direction longitudinally of the tubes of the second group.

3. A combined heat exchanger and thermoelectrically energized pump as set forth in claim 2 wherein the thermocouple elements are arranged in series to produce a circulating current around the heat exchanger pump in a direction normal to the axes of the heat exchanger tubes.

4. A combined heat exchanger and thermoelectrically energized pump of cylindrical configuration consisting of a first group of tubes adapted to contain a circulating cold fluid, a second group of tubes adapted to contain a circulating electrically conducting hot fluid, thermocouple elements adjacent opposite sides of the tubes of the second group, said first and second groups of tubes being arranged in heat exchange relationship and parallel to each other and to the axis of the heat exchanger pump and providing hot and cold junctions for the thermocouple elements, said thermocouple elements being arranged in series to produce a circulating thermoelectric current circumferentially of the heat exchanger pump and normal to the axes of the tubes of the second group, iron magnetizable by the thermoelectric current and including laminated iron pole pieces contacting adjacent tubes of the second group to provide a magnetic field transversely of said current and generate a pumping force on the electrically conducting fluid in a direction longitudinally of said second group of tubes.

5. A combined heat exchanger and thermoelectrically energized pump of cylindrical configuration consisting of a first group of tubes adapted to contain a circulating cold liquid, a second group of tubes adapted to contain a circulating electrically conducting hot liquid metal, thermocouple elements adjacent opposite sides of the tubes of the second group, said elements consisting of strips of constantan and Chromel in contact with opposite sides of the tubes of the second group, said first and second groups of tubes being in heat exchange relationship and parallel to each other and to the axis of the heat exchanger pump, said groups of tubes providing hot and cold junctions for the thermocouple elements, said elements being arranged in series to produce a circulating thermoelectric current circumferentially of the heat exchanger pump and normal to the axes of the tubes of the second group, iron magnetizable by the thermoelectric current and including laminated iron pole pieces contacting adjacent tubes of the second group, metal of good thermal conductivity filling the interstices among the tubes and pole pieces, said iron pole pieces providing a magnetic field transversely of said current and generating a pumping force on the liquid metal in a direction longitudinally of the tubes of said second group.

No references cited.